United States Patent [19]

Kalleicher

[11] 4,006,580
[45] Feb. 8, 1977

[54] CUTTING HEIGHT ADJUSTING MEANS FOR LAWN-MOWERS

[75] Inventor: Artur Kalleicher, Kirchen, Sieg, Germany

[73] Assignee: Wolf-Gerate GmbH, Gregor-Wolf-Strabe, Germany

[22] Filed: Apr. 4, 1975

[21] Appl. No.: 565,066

[30] Foreign Application Priority Data

Apr. 22, 1974 Germany ............................ 2419364

[52] U.S. Cl. .................................. 56/17.2; 280/43
[51] Int. Cl.² .......................................... A01D 55/32
[58] Field of Search ............ 56/17.2, 255; 280/43, 280/43.17, 43.21

[56] References Cited

UNITED STATES PATENTS 3,161,006  12/1964  Willette et al. ...................... 56/17.2
3,872,654  3/1975   Brundage et al. ............... 56/17.2 X

*Primary Examiner*—J.N. Eskovitz
*Attorney, Agent, or Firm*—Ostrolenk, Faber, Gerb & Soffen

[57] ABSTRACT

Cutting height adjustment device for lawn mower blades: adjustment is obtained by adjusting the height of the mower wheel axle with respect to the mower chassis; the wheel axle is carried on a crank arm which pivots about a shaft fixedly positioned with respect to the chassis; the shaft is pivotable to a plurality of angular positions; a detent disc is secured to the shaft; a latch, non-shiftable with respect to the chassis, is operable to selectively engage in and disengage from the detents, thereby to position the blades at various heights; a pointer associated with and movable with the shaft indicates blade height on a scale on the chassis.

6 Claims, 3 Drawing Figures

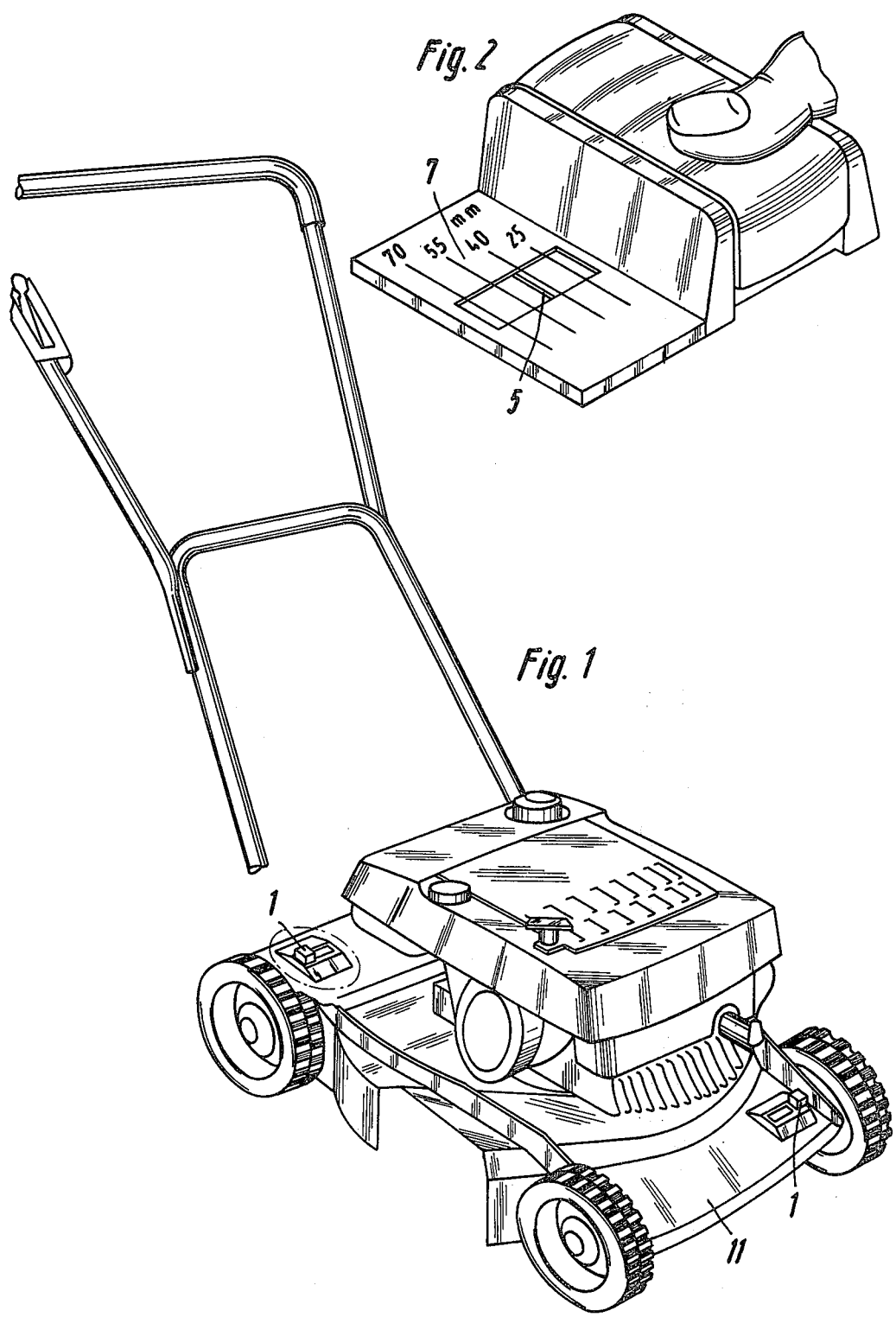

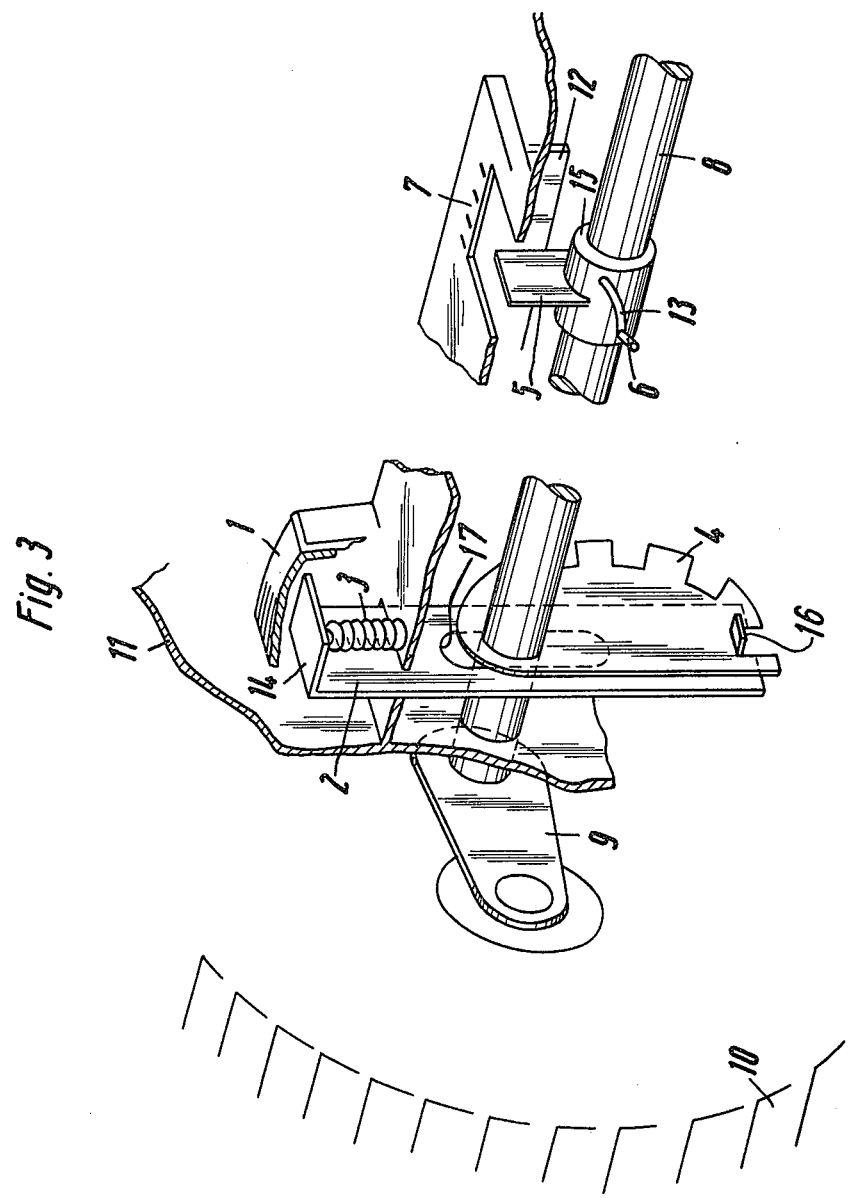

CUTTING HEIGHT ADJUSTING MEANS FOR LAWN-MOWERS

The invention relates to a cutting height adjusting means for lawn-mowers in which the distance of the blades from the running surface is effected by relative adjustment of the wheel axles with respect to the chassis and in which the wheel axles are carried by a crank arm which is mounted on a shaft having an axis fixed with respect to the chassis and with said shaft may be arrested in a plurality of angular positions by a latch engaging in detents under spring bias.

Such cutting height adjusting means are known in various forms. Compared with the simplest height adjusting means comprising a plug-type axle, in which the individual wheel axles had to be removed from one chassis bore and plugged into another and screwed tight, they have the advantage of relatively simple manipulation because only three functions need be carried out, i.e. an unlocking, adjustment and locking.

Height adjusting means of this type are known in which the locking means operates with radially axially engaging push bolts. This construction permits both a one-wheel and a two-wheel adjustment. The running wheel is pivoted by means of an angled lever in the radius about a fixed point. For adjustment the lawn-mower is slightly raised at the front or back, i.e. where the adjustment is to be made, and the bolt pulled out of the detents. A pressure spring serves to secure the engagement. In simpler constructions the adjusting lever is self-resilient and with axial bolts simultaneously performs the securing function.

However, the disadvantage of all these known embodiments is that they have long hand levers which are troublesome when mowing under shrubs and bushes and are relatively difficult to actuate. The cutting height set is apparent either only from the lever positions or from the markings on the individual detents or notches, and recognition of a predetermined height requires considerable experience.

The invention is based on the problem of providing a cutting height adjusting means for lawn mowers which guarantees reliable setting to the desired height with easy and convenient manipulation and simple construction by means of an operating member projecting only slightly beyond the chassis.

According to the invention this problem is solved in an adjusting means of the type referred to at the beginning in that the latch displaceably mounted in the chassis and engaging in detents of a detent segment mounted on the shaft projects beyond the chassis only with an actuating member 14. Said actuating member may be constructed in the simplest manner as a bent-over portion of the latch or bolt. To improve its optical impression, the actuating member may be covered by a button consisting for example of plastic and displaceable in a suitable guide in the chassis. The actuating member and the button may be disposed on the leading or trailing front side of the mower chassis. According to a preferred embodiment of the invention the latch is however vertically disposed so that actuation from above is possible. A particularly simple construction is obtained if the latch is guided via a slot by the shaft. The second guide is then provided in the form of a slot in the housing.

To adjust the cutting height it is only necessary to release the latching by depressing the button, the desired height then being set and an automatic latching ocurring when the button is released.

To permit still easier adjustment it is possible to provide a relief spring which after unlocking effects an adjustment to a middle position.

To render the cutting height set optically visible, according to a further development of the invention a pointer is provided which projects through an opening in the chassis which opening is provided with a graduated scale. This provides an indication of the height in dependence upon the angular position of the shaft. Preferably, said optical indicating device is arranged directly adjacent the operating button. According to a preferred embodiment of the invention, the construction is such that the pointer is mounted on a sleeve displaceable on the shaft and is non-rotatably guided in the housing opening. The axial displacement may be effected by a slot guide in that a radial guide pin engages into a helical slot in the sleeve.

An embodiment of the invention will be explained hereinafter with the aid of the drawings, wherein:

FIG. 1 is a perspective view of a motor lawn mower equipped with the height adjusting means according to the invention, FIG. 2 is to a larger scale a perspective fragmental view of an operating button with associated optical indication, FIG. 3 is a schematic perspective illustration of the cutting height adjusting means according to the invention.

As apparent from FIG. 1, an actuating knob 1 is arranged in the chassis 11 at both the front and rear above the wheel axles. The knob projects only slightly beyond the surface of the chassis. Said button may conveniently consist of plastic and is mounted to be easily movable in a corresponding vertical guide whereby it is movable up and down. As shown in FIG. 2, adjacent the button is a chassis opening in which a pointer 5 runs. The position of the pointer may be read with respect to a scale 7. The functioning of the cutting height adjusting means is apparent from FIG. 3. A shaft 8 mounted rotatably in the chassis 11 but with a fixed axis carries at both ends a crank arm 9 which in turn rotatably mounts the running wheel 10 via a wheel axle. Fixedly welded to the shaft 8 is a detent segment 4 having a plurality of detents into which a latch 2 can engage by means of an angled extension 16 at the lower end. The latch 2 is equipped with a slot 17 with which it is guided on the shaft 8. A second guide for shaft 8 is formed by a slot (not shown) in the chassis 11. In the part thereof projecting beyond the chassis the latch 2 comprises an actuating member in the form of a bent-over portion 14 which lies below the button 1 and is actuated directly by the latter. Disposed between the bent-over portion 14 and the chassis is a helical pressure spring 3 which effects automatic latching of latch 2 in a detent of segment 4 after release of the button 1.

A sleeve 15 carrying the pointer 5 is displaceably mounted on the shaft 8. Said sleeve is secured against rotational movement by the pointer 5 thereof being guided in the housing opening. A guide pin 6 inserted radially in the shaft 8 runs in a guide slot 13 of the sleeve 15 so that when the shaft 8 rotates the pointer 5 slides axially of shaft 8 in the opening and along the scale 7. This permits the height adjustment to be read off exactly from the scale 7 and pointer 5. To improve the pointer guiding two lateral webs 12 are provided beneath the opening.

The height adjustment can be effected simply, in cases when no relief spring is provided, by slightly raising the chassis, producing an unlocking by exerting a pressure on the button 1, then raising or lowering the chassis to the desired height and finally releasing the button 1, producing an automatic locking. During this operation the exact cutting height adjustment may be read from the pointer 5 and scale 7.

I claim:

1. Cutting height adjustment means for lawn mowers, wherein the mower comprises;

a chassis, wheels which ride on a running surface; said wheels having an axle about which they rotate, and wherein said adjustment means is for adjusting the height of said wheel axle over the running surface with respect to the height of said chassis;

said adjustment means comprising:

a shaft pivotally connected to said chassis at a fixed location; a crank arm, said crank arm being connected to and supported on said shaft; said crank arm being rotatable with respect to said chassis around said shaft, without shifting of the position of said shaft with respect to said chassis; said axle being carried in said crank arm remote from said connection of said crank arm on said shaft;

detent means secured to said shaft and rotatable therewith; said detent means comprising a plurality of separated detents, each of which, in turn, is movable into a position to be engaged by a latch as said shaft rotates;

a latch that is so secured on said chassis so as to prevent changing the location of said latch on said chassis; said latch comprising an extension engageable in each said detent as it is rotated by said shaft into position to be engaged by said extension, and an operating member secured to said extension and normally fixed, but movable to move said latch extension into and out of engagement with said detents; said operating member being operable to shift said extension out of each said detent, thereby to permit rotation of said shaft, and also being operable to shift said extension into each said detent, thereby to prohibit further rotation of said shaft, said operating member having a bent-over portion, and a return spring disposed between said chassis and said operating member for normally biasing said extension into each detent as each said detent is presented to said extension.

2. The cutting height adjustment means of claim 1, further comprising a release button carried on said chassis and operable into engagement with said operating member to shift same axially.

3. The cutting height adjustment means of claim 1, wherein said latch extends past and across said shaft; an elongated hole through said latch through which said shaft passes, said elongated hole being of a length to provide clearance for axial movement of said latch.

4. The cutting height adjustment means of claim 1, further comprising:

a pointer connected with said shaft; means for shifting said pointer axially along said shaft as said shaft is rotated; an opening in said chassis through which said pointer may be seen; a scale on said chassis adjacent to said chassis opening and calibrated to indicate the height of said chassis as said pointer shifts to different respective positions along said shaft.

5. Cutting height adjustment means for lawn mowers, wherein the mower comprises:

a chassis, wheels which ride on a running surface; said wheels having an axle about which they rotate, and wherein said adjustment means is for adjusting the height of said wheel axle over the running surface with respect to the height of said chassis;

said adjustment means comprising:

a shaft pivotally connected to said chassis at a fixed location; a crank arm, said crank arm being connected to and supported on said shaft; said crank arm being rotatable with respect to said chassis around said shaft, without shifting of the position of said shaft with respect to said chassis; said axle being carried in said crank arm remote from said connection of said crank arm on said shaft;

detent means secured to said shaft and rotatable therewith; said detent means comprising a plurality of separated detents, each of which, in turn, is movable into a position to be engaged by a latch as said shaft rotates;

a latch that is so secured on said chassis so as to prevent changing the location of said latch on said chassis; said latch comprising an extension engageable in each said detent as it is rotated by said shaft into position to be engaged by said extension, and an operating member secured to said extension and normally fixed, but moveable to move said latch extension into and out of engagement with said detents; said operating member being operable to shift said extension out of each said detent, thereby to permit rotation of said shaft, and also being operable to shift said extension into each said detent, thereby to prohibit further rotation of said shaft, a chassis height indicator, comprising:

a sleeve freely rotatably mounted on and displaceable axially along said shaft; a pointed affixed to said sleeve; an opening in said chassis extending along the direction of extension of said shaft and said opening being defined, at least in part, by webs; a pointer extending into said opening and between said webls to be in contact therewith so as to be inhibited from rotation along with said shaft by said webs;

a helical guide slot in said sleeve and extending in a direction axially along said shaft; a radial guide pin projecting from said shaft and into said helical guide slot, whereby rotation of said shaft causes movement of said pointer along said shaft.

6. The cutting height adjustment means of claim 5, further comprising a scale on said chassis which is adjacent to said opening and is calibrated to indicate the height of said chassis as said pointer shifts to different respective positions along said shaft.

* * * * *